United States Patent
Hirano et al.

(10) Patent No.: US 12,059,868 B2
(45) Date of Patent: Aug. 13, 2024

(54) SURFACE-TREATED METAL SHEET FOR POLYOLEFIN ADHESION, AND COMPOSITE MEMBER

(71) Applicant: KABUSHIKI KAISHA KOBE SEIKO SHO (KOBE STEEL, LTD.), Kobe (JP)

(72) Inventors: Yasuo Hirano, Kakogawa (JP); Tatsuhiko Iwa, Kakogawa (JP); Tetsuya Yamamoto, Kakogawa (JP); Takeshi Watase, Kakogawa (JP)

(73) Assignee: KOBE STEEL, LTD., Kobe (JP)

( * ) Notice: Subject to any disclaimer, the term of this patent is extended or adjusted under 35 U.S.C. 154(b) by 14 days.

(21) Appl. No.: 16/488,297

(22) PCT Filed: Feb. 21, 2018

(86) PCT No.: PCT/JP2018/006100
§ 371 (c)(1),
(2) Date: Aug. 23, 2019

(87) PCT Pub. No.: WO2018/168358
PCT Pub. Date: Sep. 20, 2018

(65) Prior Publication Data
US 2019/0375194 A1    Dec. 12, 2019

(30) Foreign Application Priority Data
Mar. 17, 2017  (JP) .................................. 2017-053104

(51) Int. Cl.
| | | |
|---|---|---|
| *B32B 15/085* | (2006.01) | |
| *B32B 15/092* | (2006.01) | |
| *C09J 7/24* | (2018.01) | |
| *C09J 163/00* | (2006.01) | |

(52) U.S. Cl.
CPC .......... *B32B 15/085* (2013.01); *B32B 15/092* (2013.01); *B32B 2255/06* (2013.01); *B32B 2323/00* (2013.01); *C09J 7/241* (2018.01); *C09J 163/00* (2013.01)

(58) Field of Classification Search
CPC ......... B32B 7/12; B32B 15/08; B32B 15/085; B32B 2255/06; B32B 2255/26; B32B 2255/28; B32B 15/092; B32B 2323/00; B32B 2250/02; B32B 2509/00; B32B 2605/00; B29C 45/14311; B29C 2045/14877; B29C 45/14631; C09J 7/241; C09J 163/00; C09J 7/20; C09J 7/22; C09J 123/26; C09J 2301/208; C09J 2423/00; C09J 2463/00; C09J 2301/312; C08G 59/4028; C09D 151/06; C09D 5/00; C09D 163/00; C09D 123/26; C23C 2222/20; C23C 26/00
See application file for complete search history.

(56) References Cited

U.S. PATENT DOCUMENTS

| | | | | |
|---|---|---|---|---|
| 4,345,004 A | * | 8/1982 | Miyata .................... | B05D 7/148 156/330 |
| 4,486,556 A | * | 12/1984 | Kordomenos ......... | C08G 18/36 523/400 |
| 5,139,857 A | * | 8/1992 | Herndon ................... | B32B 7/12 428/220 |
| 5,654,104 A | * | 8/1997 | Yoshizaki ............... | B32B 15/08 428/461 |
| 6,294,268 B1 | * | 9/2001 | Muraoka ................. | B32B 27/32 428/515 |
| 2006/0108016 A1 | * | 5/2006 | Funatsu .................. | B32B 15/18 138/141 |
| 2008/0081196 A1 | * | 4/2008 | Saito ...................... | C09D 5/084 428/425.8 |
| 2013/0008570 A1 | * | 1/2013 | Ikeda ...................... | C21D 8/02 148/533 |
| 2013/0338284 A1 | | 12/2013 | Ito et al. | |
| 2015/0361304 A1 | * | 12/2015 | Gruhn ..................... | B32B 21/04 428/414 |
| 2015/0375478 A1 | | 12/2015 | Gruhn et al. | |
| 2016/0243794 A1 | | 8/2016 | Hirano et al. | |
| 2020/0230854 A1 | * | 7/2020 | Agag ..................... | B32B 15/18 |

FOREIGN PATENT DOCUMENTS

| | | | |
|---|---|---|---|
| EP | 3 434 470 A1 | | 1/2019 |
| JP | 59124965 A | * | 7/1984 |
| JP | 7-33638 U | | 6/1995 |
| JP | 2005-132105 A | | 5/2005 |
| JP | 4901116 B2 | | 1/2012 |

(Continued)

OTHER PUBLICATIONS

Machine Translation of JP 59124965 (Year: 2021).*
Mitsui Chemicals, "Grades of Unistole R", online 2024, https://us.mitsuichemicals.com/content/dam/mitsuichemicals/sites/mca/documents/sites/default/files/media/document/Grades_of_UNISTOLE_R.pdf (Year: 2024).*
International Search Report issued Apr. 10, 2018 in PCT/JP2018/006100 filed Feb. 21, 2018.
English translation of the International Preliminary Report on Patentability issued on Sep. 26, 2019, in PCT/JP2018/006100, 8 pages.
Extended European Search Report issued Nov. 6, 2020 in corresponding European Patent Application No. 18767633.3, 9 pages.

*Primary Examiner* — Callie E Shosho
*Assistant Examiner* — Bethany M Miller
(74) *Attorney, Agent, or Firm* — Oblon, McClelland, Maier & Neustadt, L.L.P.

(57) ABSTRACT

A surface-treated metal sheet for polyolefin adhesion is provided with a metal sheet, a first layer provided on at least one surface of the metal sheet, and a second layer provided on the first layer, wherein the first layer containing an epoxy resin and a blocked isocyanate, the second layer containing an acid-modified polyolefin resin, the thickness of the first layer being 15 to 40 μm, and the thickness of the second layer being 4 to 30 μm.

11 Claims, No Drawings

(56) References Cited

FOREIGN PATENT DOCUMENTS

| JP | 2015-80884 A | 4/2015 |
| JP | 2015-110318 A | 6/2015 |

\* cited by examiner

SURFACE-TREATED METAL SHEET FOR POLYOLEFIN ADHESION, AND COMPOSITE MEMBER

TECHNICAL FIELD

The present invention relates to a surface-treated metal sheet for polyolefin adhesion, and a composite member.

BACKGROUND ART

Many metal components, including metal sheets, are used in vehicles, domestic appliances, OA (office automation) equipment, and the like. In many cases, such metal components are used after being obtained by imparting a desired shape to a metal sheet through pressing and then joining the metal sheet to another metal component or a plastic component by means of welding, screwing, or the like.

Meanwhile, if an adhesiveness to a plastic can be imparted to a surface of a metal sheet, it is possible to obtain a composite member in which the metal sheet and the plastic are bonded to each other simply by pressing the metal sheet, setting the pressed metal sheet in a plastic-molding die, injecting a molten plastic, and then solidifying the plastic by cooling. For this reason, a metal sheet to which an adhesiveness to a plastic has been imparted can contribute to increased efficiency of the member production process and to a reduction in weight of the member.

A metal sheet to which an adhesiveness to a plastic has been imparted may be, for example, a surface-treated metal sheet in which a resin layer such as an adhesive layer, which is capable of being bonded to a plastic and a metal sheet, is provided on a surface of the metal sheet. Specifically, a surface-treated metal sheet disclosed in Patent Literature 1 may be mentioned as an example.

Patent Literature 1 discloses a surface-treated metal sheet in which a metal substrate, a chemical conversion coating film, a primary layer, and an adhesive layer are laminated in this order, wherein the chemical conversion coating film contains colloidal silica and a thermosetting resin. Patent Literature 1 gives a disclosure to the effect that it is possible to provide a surface-treated metal sheet for forming a resin molded article composite that is excellent in adhesiveness to a metal substrate and a resin molded article.

As a resin layer (adhesive layer), such as described above, used in imparting an adhesiveness to a plastic to a surface of a metal sheet, it is useful to use a hot-melt adhesive that is melted by being heated to exhibit an adhesiveness to a plastic and that is increased in strength when being solidified by cooling. Further, as a method for imparting an adhesiveness to a plastic to a surface of a metal sheet by using such a hot-melt adhesive, there may be mentioned a method of applying a liquid obtained by dissolving or dispersing the hot-melt adhesive into a solvent onto the metal sheet. Such a method can produce a surface-treated metal sheet in which a resin layer such as an adhesive layer, which is capable of being bonded to a plastic and a metal sheet, is provided on a surface of the metal sheet with a high productivity and at a low cost.

Meanwhile, various plastics may be mentioned as examples of the plastic that is bonded to the metal sheet. Among these, a polyolefin such as polypropylene is widely used in the field of automobiles and the like because of being available at a low cost and having a high strength. Due to this situation, a surface-treated metal sheet that is excellent in adhesiveness to a polyolefin is demanded.

CITATION LIST

Patent Literature

Patent Literature 1: Japanese Unexamined Patent Publication No. 2015-110318

SUMMARY OF INVENTION

The present invention has been made in view of such circumstances, and an object thereof is to provide a surface-treated metal sheet for polyolefin adhesion that is excellent in adhesiveness to a polyolefin. Also, an object of the present invention is to provide a composite member that is excellent in adhesiveness to a polyolefin.

One aspect of the present invention is directed to a surface-treated metal sheet for polyolefin adhesion, the surface-treated metal sheet comprising a metal sheet, a first layer provided on at least one surface of the metal sheet, and a second layer provided on the first layer, wherein the first layer containing an epoxy resin and a blocked isocyanate, the second layer containing an acid-modified polyolefin resin, the first layer having a thickness of 15 to 40 μm, and the second layer having a thickness of 4 to 30 μm.

The foregoing and other objects, features, and advantages of the present invention will be apparent from the following detailed description of the invention.

DESCRIPTION OF EMBODIMENTS

The present inventors have paid attention to the fact that, when a polyolefin is used as the plastic that is to be bonded to the metal sheet, a layer or the like obtained by using a hot-melt adhesive containing an acid-modified polyolefin is suitably used as the resin layer (adhesive layer) that imparts an adhesiveness to the plastic to the surface of the metal sheet. Patent Literature 1 also gives a disclosure to the effect that, when a composite with a resin molded article made of nylon is to be formed, an adhesive for nylon is preferable, and that, when a composite with a resin molded article made of polypropylene is to be formed, an adhesive for polypropylene is preferable. The present inventors have paid attention to the fact that, when a polyolefin is used as the plastic that is to be bonded to the metal sheet, it is possible to obtain a surface-treated metal sheet that is excellent in adhesiveness to the metal sheet and the polyolefin serving as the plastic by using a resin layer containing an acid-modified polyolefin as the resin layer that is provided on the surface of the metal sheet.

Also, it is demanded that, in a composite member such as described above in which a metal sheet and a plastic are bonded, an adhesiveness between the metal sheet that is provided in the surface-treated metal sheet and the polyolefin serving as the plastic is further enhanced. From this, there is not only a demand that an acid-modified polyolefin is contained as a component of the resin layer that is provided on the surface of the metal sheet but also a demand for a technique that further enhances the adhesiveness between the metal sheet and the plastic.

As a result of various studies, the present inventors have found out that the aforementioned object of providing a surface-treated metal sheet for polyolefin adhesion that is excellent in adhesiveness to a polyolefin is achieved by the present invention described below.

According to the studies made by the present inventors, in the case of using a dispersion liquid in which an acid-modified polyolefin is dispersed in a solvent for forming a resin layer (adhesive layer) containing an acid-modified polyolefin, the viscosity of the obtained dispersion liquid becomes too high when the content ratio (concentration) of the acid-modified polyolefin is too high, leading to a tendency such that the dispersion liquid cannot be appropriately applied. For this reason, about 20 mass % has been a limit of the content ratio of the acid-modified polyolefin in this dispersion liquid. On the other hand, the adhesive strength between the metal sheet and the plastic depends on the thickness of the resin layer (adhesive layer) that is provided on the surface of the metal sheet, and there has been a tendency such that, the larger the thickness of the resin layer is, the higher the adhesive strength is. For example, in attaining a practical adhesive strength of 5 MPa by a conventional method, it has been necessary that the thickness of the resin layer is about 10 μM or more. Further, when a dispersion liquid in which the content ratio of an acid-modified polyolefin is about 20 mass % is used in order to achieve a resin layer having a thickness of about 10 μm or more, liquid application to a thickness of about 50 μm is necessary.

Also, in forming a resin layer by applying a dispersion liquid onto a metal sheet, the solvent is evaporated by heating or the like after the application. However, by such a method, the viscosity of the dispersion liquid applied onto the metal sheet increases in accordance with the evaporation of the solvent, and bubbles generated in accordance with the evaporation of the solvent are less likely to disappear. For this reason, there has been a case in which a resin layer being in a state in which a large amount of bubbles are mingled is formed as the resin layer formed on the metal sheet. In order to suppress this mingling of the bubbles, there can be considered a method of decreasing the heating rate or reducing the thickness. However, when the heating rate is decreased, the productivity lowers. When the thickness is reduced, the adhesive strength is not sufficiently enhanced, as described above. Also, there can be considered a method of applying the dispersion liquid for a plurality of times to laminate thin resin layers; however, this method lowers the productivity.

From these, it is demanded that a sufficient adhesive strength is ensured even when the resin layer containing an acid-modified polyolefin is reduced in thickness. In order to achieve this goal, the present inventors have made studies on a method of enhancing the adhesive strength other than increasing the thickness of the resin layer containing an acid-modified polyolefin. As a result, the present inventors have found out that the adhesive strength between the resin layer and the plastic changes when another layer is provided between the metal sheet and the resin layer containing the acid-modified polyolefin. Upon detailed studies on this point, the present inventors have found out that it is effective to use a layer containing an epoxy resin and a blocked isocyanate as the aforementioned other layer, thereby arriving at the concept of the present invention such as described below.

Hereinafter, embodiments according to the present invention will be described; however, the present invention is not limited to these alone.

A surface-treated metal sheet for polyolefin adhesion according to an embodiment of the present invention includes a metal sheet, a first layer provided on at least one surface of the metal sheet, and a second layer provided on the first layer. Further, the second layer is a layer containing an acid-modified polyolefin resin. The first layer having a thickness of 15 to 40 μm and containing an epoxy resin and a blocked isocyanate is provided between the second layer and the metal sheet. By providing the first layer and the second layer such as described above, a surface-treated metal sheet having a sufficient adhesive strength to a polyolefin can be obtained even when the second layer, which is the resin layer containing the acid-modified polyolefin, has a thickness of 4 to 30 μm.

The metal sheet used in the present embodiment is not particularly limited as long as it can be used as a metal sheet in a surface-treated metal sheet. The metal sheet may be a metal sheet provided with a metal substrate and other layers such as a chemical conversion coating film disposed on the metal substrate, or may be one made of a metal substrate alone without being provided with such layers. Examples of the metal substrate include steel sheets such as a cold rolled steel sheet such as a non-plated cold rolled steel sheet, a hot-dip galvanized steel sheet, a hot-dip galvannealed steel sheet (hot-dip Zn—Fe galvannealed steel sheet), a hot-dip Zn-5% Al galvannealed steel sheet, an electrogalvanized steel sheet, a Zn—Ni electrogalvanized steel sheet, and a Galvalume steel sheet (registered trademark), and also an aluminum sheet and a titanium sheet. Among these, a hot-dip galvanized steel sheet, an electrogalvanized steel sheet, an aluminum sheet, and a titanium sheet are preferable, and a hot-dip galvannealed steel sheet is more preferable. The metal sheet may or may not be subjected to a chromate treatment; however, one not subjected to a chromate treatment is preferable. The thickness of the metal sheet is not particularly limited; however, the thickness is preferably about 0.3 to 3.2 mm in view of reducing the weight of the final product. Also, the chemical conversion coating film is not particularly limited and may be, for example, a layer obtained from a coating liquid containing a resin, colloidal silica, a silane coupling agent, and the like.

The first layer used in the present embodiment is not particularly limited as long as it is a layer having a thickness (thickness after drying) of 15 to 40 μm and containing an epoxy resin and a blocked isocyanate. The first layer is a layer that achieves joining between the metal sheet and the second layer. Also, by providing the first layer, the second layer will have a sufficiently high adhesiveness to the polyolefin even when the second layer has a comparatively small thickness of, for example, 4 μm. In other words, the first layer exhibits an effect of improving the adhesiveness of the second layer to the polyolefin. Here, the second layer has a sufficiently high adhesiveness to the polyolefin even when the second layer has a comparatively small thickness of 4 μm, so that the second layer will have a sufficiently high adhesiveness to the polyolefin even when the thickness of the second layer is 4 μm or more, for example, 4 to 30 μm. Further, since the first layer contains an epoxy resin and a blocked isocyanate, the first layer has a high adhesiveness both to the metal sheet and to the second layer. Accordingly, a surface-treated metal sheet being excellent in adhesiveness between the polyolefin and the metal sheet can be obtained. These seem to be because the first layer is a layer obtained by incorporation of a blocked isocyanate into an epoxy resin having a comparatively high adhesiveness.

A lower limit value of the thickness of the first layer is 15 μm or more, preferably 18 μm or more, and more preferably 20 μm or more. Also, an upper limit value of the thickness of the first layer is 40 μm or less, preferably 30 μm or less. When the first layer is too thin, the effect that the first layer produces, for example, the effect of improving the adhesiveness of the second layer to the polyolefin, is less likely to be exhibited sufficiently. Also, the thicker the first layer is, the more the effect that the first layer produces tends to be exhibited. On the other hand, however, when the first layer is too thick, the effect thereof tends to be hardly improved further. Also, when the first layer is too thick, there is a tendency such that bubbles and the like are mingled in the first layer in forming the first layer.

Accordingly, when the thickness of the first layer is within the aforementioned range, the adhesiveness of the second layer to the polyolefin can be improved without increasing the thickness of the first layer to an extent that is more than necessary.

The epoxy resin is not particularly limited as long as it is a polyepoxide compound having two or more epoxy groups in one molecule. Examples of the epoxy resin include bisphenol-A type epoxy resin, bisphenol-F type epoxy resin, and hydrogenated bisphenol-A type epoxy resin.

The blocked isocyanate is not particularly limited as long as it is one obtained by blocking an isocyanate group of an isocyanate compound with a blocking agent. Examples of the isocyanate compound include aliphatic diisocyanates such as hexamethylene diisocyanate; alicyclic diisocyanates such as isophorone diisocyanate; and aromatic diisocyanates such as xylylene diisocyanate, tolylene diisocyanate, and 4,4'-diphenylmethane diisocyanate. Examples of the blocking agent include phenols, alcohols, lactam, oxime, amines, and activated methylene compounds. Examples of the blocked isocyanate include compounds obtained by blocking the isocyanate compound with the blocking agent.

A lower limit value of the content of the blocked isocyanate is preferably 0.1 mass % or more, more preferably 0.3 mass % or more, relative to a total mass of the epoxy resin and the blocked isocyanate. Also, an upper limit value of the content of the blocked isocyanate is preferably 10 mass % or less, more preferably 5 mass % or less, relative to the total mass. When the blocked isocyanate is either too large or too small in amount, the effect that the first layer produces, for example, the effect of improving the adhesiveness of the second layer to the polyolefin, is less likely to be exhibited sufficiently.

It is sufficient that the first layer contains the epoxy resin and the blocked isocyanate, so that the first layer may contain other components or may be a layer made only of the epoxy resin and the blocked isocyanate. Examples of the aforementioned other components include rust-preventive agents such as zinc phosphite and zinc oxide, and pigments such as titanium oxide and silica.

Also, a method of forming the first layer is not particularly limited as long as the first layer can be formed. The method for forming the first layer may be, for example, a method of applying a coating liquid (first layer forming coating liquid) containing the epoxy resin and the blocked isocyanate onto one surface or both surfaces of the metal sheet. Further, the metal sheet on which the first layer forming coating liquid has been applied is dried by heating in accordance with the needs. By performing this process, the first layer is formed on the metal sheet. The first layer forming coating liquid is obtained by putting the epoxy resin and the blocked isocyanate into a solvent and stirring the resultant. Examples of the solvent include xylene and cyclohexanone. Also, examples of the application method include the roll coater method, the spray method, and the curtain flow coater method. Also, the temperature and the time of drying by heating are not particularly limited; however, the heating may be carried out, for example, at a temperature of around 200° C., at which the epoxy resin is cured, for several ten seconds to several minutes.

The second layer used in the present embodiment is not particularly limited as long as the thickness (thickness after drying) is 4 to 30 μm, and the second layer is a layer containing an acid-modified polyolefin. The second layer is a layer that achieves joining between the first layer and the polyolefin serving as the plastic. The second layer containing the acid-modified polyolefin is a layer containing what is known as a hot-melt adhesive, that is, a layer that is melted by heating (for example, heating at 200° C. or higher) to exhibit adhesiveness to the plastic and increases in strength when solidified by cooling. This resin layer is already solidified by cooling at the time of actual use of the surface-treated metal sheet, for example, at −40 to 125° C. and, in that state, exhibits a sufficient adhesiveness to the plastic. Specifically, a molten plastic is brought into contact with the second layer provided in the surface-treated metal sheet, and thereafter, the second layer and the plastic are solidified by cooling to achieve joining between the second layer and the plastic. When the molten plastic is brought into contact with the second layer, the second layer is also melted, whereby the second layer and the plastic are partially dissolved into each other to achieve suitable joining between the second layer and the plastic. Also, as described above, the first layer achieves joining between the metal sheet and the second layer. Further, the first layer has a high adhesiveness to the second layer, and the second layer has a high adhesiveness to the first layer. For this reason, the first layer and the second layer are suitably joined to each other. By these, the second layer in collaboration with the first layer achieves joining between the metal sheet and the plastic.

A lower limit value of the thickness of the second layer is 4 μm or more, preferably 5 μm or more. An upper limit value of the thickness of the second layer is 30 μm or less, preferably 15 μm or less, and more preferably 13 μm or less. When the second layer is too thin, a sufficient adhesiveness to the polyolefin is less likely to be exhibited even when the first layer is provided between the second layer and the metal sheet. Also, the thicker the second layer is, the higher the adhesiveness to the polyolefin tends to be. However, even when the second layer is too thick, the tendency thereof cannot be sufficiently exhibited, and increase in the thickness invites wastefulness in terms of costs. Also, when the second layer is too thick, there is a tendency such that bubbles and the like are mingled in the second layer in forming the second layer. Accordingly, when the thickness of the second layer is within the aforementioned range, the adhesiveness of the second layer to the polyolefin can be improved while suppressing mingling of the bubbles and the like.

The acid-modified polyolefin may be, for example, a polyolefin or the like that is modified by a carboxylic acid, a carboxylic anhydride, an acid component of a carboxylic acid derivative, or the like. The acid-modified polyolefin may be, for example, one obtained by graft polymerization of at least one kind selected from the group consisting of an unsaturated dicarboxylic acid, an anhydride thereof, and an ester derivative thereof to a polyolefin resin, or the like.

Examples of the polyolefin include polyethylene, polypropylene, polybutene, polymethylpentene, copolymer of an α-olefin with ethylene or propylene, ethylene-vinyl acetate copolymer, ethylene-acrylic acid copolymer, ethylene-methacrylic acid copolymer, ethylene-maleic anhydride copolymer, and propylene-maleic anhydride copolymer. The above exemplified polyolefins may be used either alone as one kind or in combination of two or more kinds as the polyolefin. Also, in view of enhancing the adhesiveness to the metal sheet and the plastic, the polyolefin preferably contains polypropylene, and is more preferably made of polypropylene alone. In other words, the acid-modified polyolefin is preferably an acid-modified polypropylene.

The polypropylene may be either a homopolypropylene (homopolymer of propylene) or a copolymer of propylene with at least one kind selected from the group consisting of ethylene, other α-olefins, and vinyl compounds. The other α-olefins are preferably α-olefins having a carbon number of 4 to 18, examples thereof including 1-butene, isobutene, 1-pentene, 4-methyl-1-pentene, 1-hexene, 1-octene, 1-decene, and 1-dodecene. The polypropylene is preferably a homopolypropylene in view of enhancing the adhesiveness to the metal sheet and the plastic.

Examples of the unsaturated dicarboxylic acid include maleic acid, fumaric acid, citraconic acid, mesaconic acid, and itaconic acid. Examples of the unsaturated dicarboxylic anhydride include maleic anhydride, itaconic anhydride, and citraconic anhydride. Examples of the ester derivatives of the unsaturated dicarboxylic acid include monomethyl maleate. Among these, an unsaturated dicarboxylic anhydride is preferable, and maleic anhydride is more preferable. Also, the unsaturated dicarboxylic acid, the anhydride thereof, or the ester derivative thereof may be used either alone as one kind or in combination of two or more kinds.

As the acid-modified polyolefin, a commercially available product may be used. Examples of the commercially available product include "UNISTOLE (registered trademark)" series, "NOVATEC (registered trademark)" series and "WINTEC (registered trademark)" series manufactured by Japan Polypropylene Corporation, and "Prime Polypro (registered trademark)" series manufactured by Prime Polymer Co., Ltd.

Also, the acid-modified polyolefin is produced by graft polymerization of an unsaturated dicarboxylic acid, an anhydride thereof, or an ester derivative thereof with the polyolefin according to a conventional method. A polyolefin that is acid-modified by maleic anhydride (maleic anhydride-modified polyolefin) is produced by addition of maleic anhydride to polypropylene. Specifically, the maleic anhydride-modified polyolefin can be produced in the following manner. As a solvent, xylene, and 2,2,4-trimethyl-1,3-pentanediol diisobutyrate or the like are used, and polypropylene, maleic anhydride, and organic peroxide (for example, t-butylperoxy-2-ethylhexyl carbonate or the like) are introduced suitably in an arbitrary order or together, and graft polymerization of maleic anhydride with the polyolefin is carried out typically under heating, for example, at about 130 to 150° C. By this process, a maleic anhydride-modified polyolefin can be produced.

The acid value of the acid-modified polyolefin is preferably 3 to 100 mgKOH/g, more preferably 5 to 80 mgKOH/g, and still more preferably 5 to 60 mgKOH/g. When the acid value of the acid-modified polyolefin is too small, it is difficult to produce a coating liquid for forming a surface-treating coating film. Accordingly, a suitable surface-treating coating film is less likely to be formed. Also, the acid value of the acid-modified polyolefin may be high; however, about 100 mgKOH/g is a limit. For this reason, the acid value of the acid-modified polyolefin is preferably 100 mgKOH/g or less in view of producing the acid-modified polyolefin.

Also, it is sufficient that the second layer is a layer containing the acid-modified polyolefin, and the second layer may be a layer made of the acid-modified polyolefin alone. Also, the second layer may contain other components to such an extent that the effect of the present invention is not deteriorated. Examples of the other components include inorganic particles, and thermoplastic resins other than the acid-modified polyolefin.

Also, examples of the inorganic particles include particles such as talc, calcium carbonate, and aluminum oxide. The inorganic particles may be used either alone as one kind or in combination of two or more kinds.

Examples of the thermoplastic resins include polystyrene resin, acrylonitrile-butadiene-styrene (ABS) copolymer, acrylonitrile-EPDM (ethylene-propylene-diene rubber)-styrene (AES) copolymer, acrylic resin, polybutadiene, polyacetal resin, polyether resin, polyvinyl acetate, polyvinyl chloride, and polyvinylidene chloride. Also, the thermoplastic resins may be used either alone as one kind or in combination of two or more kinds.

The content of the acid-modified polyolefin is preferably 80 mass % or more, still more preferably 90 mass % or more, further more preferably 99.91 mass % or more, particularly preferably 99.95 mass % or more, and most preferably 100 mass % (the resin contained in the second layer is the acid-modified polyolefin alone), relative to the total resin components of the second layer.

Also, a method of forming the second layer is not particularly limited as long as the second layer can be formed. The method for forming the second layer may be, for example, a method of applying a coating liquid (second layer forming coating liquid) containing the acid-modified polyolefin onto the first layer. Further, the metal sheet in which the second layer forming coating liquid has been applied on the first layer is dried by heating in accordance with the needs. By performing this process, the second layer is formed on the first layer. The second layer forming coating liquid is obtained by putting the acid-modified polyolefin into a solvent and stirring the resultant. Examples of the solvent include xylene and SOLVESSO (registered trademark). Also, examples of the application method include the roll coater method, the spray method, and the curtain flow coater method. Also, the temperature and the time of drying by heating are not particularly limited; however, the heating may be carried out, for example, at a temperature of around 200° C., at which the acid-modified polyolefin is melted, for several ten seconds to several minutes.

Also, as described above, the chemical conversion coating film may be provided on the first layer side of the metal sheet. In other words, the chemical conversion coating film may be provided to enhance the corrosion resistance of the metal sheet and to ensure the adhesiveness between the metal sheet and the first layer. Also, colloidal silica is added to the chemical conversion coating film for the purpose of enhancing the corrosion resistance of the metal sheet. Further, a resin such as a thermosetting resin and a silane coupling agent are added to the chemical conversion coating film for the purpose of ensuring adhesiveness to the first layer. Furthermore, an acid may be added to the chemical conversion coating film for the purpose of ensuring chemical bond between the metal sheet and the chemical conversion coating film component. Here, the coating weight of the chemical conversion coating film is not particularly limited; however, the coating weight is preferably 0.01 to 1 g/m$^2$, more preferably 0.05 to 0.5 g/m$^2$, in terms of dry weight. When the coating weight of the chemical conversion coating film is too small, the effect of improving the adhesive strength by the chemical conversion coating film may become insufficient. Also, when the coating weight of the chemical conversion coating film is too large, the effect of improving the adhesive strength becomes saturated, leading to wastefulness in terms of costs.

The chemical conversion coating film preferably contains colloidal silica. This is because an effect of enhancing the corrosion resistance is exhibited. As the colloidal silica, "XS", "SS", "40", "N", "UP", and the like of "SNOWTEX (registered trademark)" series (colloidal silica manufactured by Nissan Chemical Industries, Ltd.) are suitably used. In particular, "SNOWTEX-40" having a surface area average particle diameter of about 10 to 20 nm is suitably used.

The resin used in the chemical conversion coating film may be, for example, a thermosetting resin such as a water-based urethane resin, a water-based acrylic-modified epoxy resin, or a water-based phenolic resin. Here, the term "water-based" means water-soluble or water-dispersible (non-water-soluble). Also, the resin may contain an acid-modified polyolefin.

It is preferable that a silane coupling agent is blended into the coating liquid that is used in forming the chemical conversion coating film. When the silane coupling agent is contained, the chemical conversion coating film can have enhanced close adhesion properties to the metal substrate. Specific examples of the silane coupling agent include amino-group-containing silane coupling agents such as γ-aminopropyltrimethoxysilane, γ-aminopropyltriethoxysilane, N-(β-aminoethyl)-γ-aminopropyltrimethoxysilane, and N-(β-aminoethyl)-γ-aminopropylmethyldimethoxysilane; glycidoxy-group-containing silane coupling agents such as γ-glycidoxypropyltrimethoxysilane, γ-glycidoxypropylmethyldimethoxysilane, γ-glycidoxypropyltriethoxysilane, and γ-glycidoxymethyldimethoxysilane; vinyl-group-containing silane coupling agents such as vinyltrimethoxysilane, vinyltriethoxysilane, and vinyltris(β-methoxyethoxy)silane; methacryloxy-group-containing silane coupling agents such as γ-methacryloxypropyltrimethoxysilane; mercapto-group-containing silane coupling agents such as γ-mercaptopropyltrimethoxysilane and γ-mercaptopropylmethyldimethoxysilane; and halogen-group-containing silane coupling agents such as γ-chloropropylmethoxysilane and γ-chloropropyltrimethoxysilane.

A method of forming the chemical conversion coating film is not particularly limited as long as the chemical conversion coating film can be formed. The method for forming the chemical conversion coating film may be, for example, a method of applying a coating liquid (chemical conversion coating film forming coating liquid) containing a resin, colloidal silica, a silane coupling agent, and the like onto at least one surface of the metal substrate. Also, the method of forming the chemical conversion coating film on the metal substrate is not particularly limited, and a conventionally known application method can be adopted. For example, the chemical conversion coating film forming coating liquid may be applied onto one surface or both surfaces of the metal substrate by using the roll coater method, the spray method, the curtain flow coater method, or the like, followed by heating and drying. The heating and drying temperature is not particularly limited; however, since the chemical conversion coating film forming coating liquid is water-based, the heating may be carried out at a temperature of around 100° C., at which water is evaporated, for several ten seconds to several minutes.

The surface-treated metal sheet may be used by being combined with a resin molded article (plastic) containing a polyolefin, so as to give a composite member in which the plastic is provided on the second layer in the surface-treated metal sheet. In other words, the composite member includes the surface-treated metal sheet and the plastic provided on the second layer in the surface-treated metal sheet. At this time, when processing is needed in the composite member, one obtained by press-molding the surface-treated metal sheet into a targeted shape may be used. Further, the surface-treated metal sheet is inserted into a mold of an injection molding machine; the mold is clamped; a molten resin is injected into the mold; and, when the resin is solidified by cooling, a composite member is obtained. That is, a method of producing the composite member includes a step of processing the surface-treated metal sheet into a predetermined shape, a step of placing the surface-treated metal sheet that has been processed into a predetermined shape into a plastic-molding die; and a step of injecting a molten plastic into the plastic-molding die in which the surface-treated metal sheet is placed, thereby to bond and join the surface-treated metal sheet and the plastic. Of course, the surface-treated metal sheet may be combined with the resin by means of the press-molding method; however, it is preferable to adopt the injection molding method in order to make use of the advantages such as the short period of time required for injection molding and the high efficiency thereof.

The injection molding conditions may be altered as appropriate according to the type of resin that constitutes a molded article, and in cases where the resin for the molded article (plastic) is polypropylene, it is possible to use a cylinder temperature of approximately 230 to 250° C., a mold temperature of approximately 45 to 55° C., an injection holding time of approximately 5 to 8 seconds, and a cooling time of approximately 20 to 30 seconds. By injection molding under these conditions, it is possible to obtain a composite member in which the plastic and the surface-treated metal sheet are strongly bonded.

In the composite member obtained as described above, the plastic is suitably bonded to the surface-treated metal sheet. That is, a composite member excellent in adhesiveness between the metal sheet and the plastic is obtained.

In the composite member, the plastic containing a polyolefin that is joined to the surface-treated metal sheet is not particularly limited as long as it is used as a resin molded article. Examples of the polyolefin include polyethylene, polypropylene, and ethylene-polypropylene copolymer. Among these, polypropylene is preferably used for the purpose of use in structural members and the like because of having a small weight (low specific gravity), a high strength, and a low cost. Also, as the plastic, one obtained by incorporating a reinforcing fiber into the polyolefin, that is, one in which the polyolefin is reinforced by a reinforcing fiber, is preferable. Such a plastic reinforced by the reinforcing fiber not only has a high strength but also has a small thermal expansion ratio, so that a thermal stress at the joining part to the metal sheet accompanying the temperature change is suppressed. Examples of the reinforcing fiber include glass fibers and carbon fibers. Also, known additives such as a pigment, a dye, a flame retardant, an antimicrobial agent, an antioxidant, a plasticizer, and a lubricant may be added to the plastic.

Also, in the composite member, the adhesive strength between the plastic and the metal sheet provided in the surface-treated metal sheet is preferably 5 MPa or more, more preferably 6 MPa or more. By using the surface-treated steel sheet, the adhesive strength of the composite member can be sufficiently enhanced.

While the present specification discloses various modes of techniques as described above, principal techniques among these will be summarized as follows.

One aspect of the present invention is directed to a surface-treated metal sheet for polyolefin adhesion, the surface-treated metal sheet including a metal sheet, a first layer provided on at least one surface of the metal sheet, and a second layer provided on the first layer, wherein the first layer containing an epoxy resin and a blocked isocyanate, the second layer containing an acid-modified polyolefin resin, the first layer having a thickness of 15 to 40 μm, and the second layer having a thickness of 4 to 30 μm.

According to such a construction, a surface-treated metal sheet for polyolefin adhesion that is excellent in adhesiveness to a polyolefin can be provided.

Also, in the surface-treated metal sheet for polyolefin adhesion, the thickness of the first layer is preferably 18 to 25 μm.

According to such a construction, the adhesiveness to the polyolefin can be further enhanced.

Also, in the surface-treated metal sheet for polyolefin adhesion, the thickness of the second layer is preferably 5 to 15 μm.

According to such a construction, the adhesiveness to the polyolefin can be further enhanced.

Also, another aspect of the present invention is directed to a composite member including the surface-treated metal sheet for polyolefin adhesion described above and a plastic provided on the second layer in the surface-treated metal sheet for polyolefin adhesion, wherein the plastic contains a polyolefin.

According to such a construction, a composite member that is excellent in adhesiveness to a polyolefin can be provided.

According to the present invention, there can be provided a surface-treated metal sheet for polyolefin adhesion that is excellent in adhesiveness to a polyolefin. Also, according to the present invention, there can be provided a composite member that is excellent in adhesiveness to a polyolefin.

Hereinafter, the present invention will be more specifically described by way of Examples; however, the scope of the present invention is not limited thereto.

EXAMPLES

First, a measurement method and an evaluation method used in the Examples and the Comparative Examples will be hereafter described.

[Adhesiveness (Adhesive Strength)]

In a composite member obtained by a production method described later, the end of the surface-treated metal sheet as viewed in the longitudinal direction and the end of the plastic as viewed in the longitudinal direction were held with a chuck of a tensile tester in an atmosphere of 25° C. and pulled at a tensile speed of 10 mm/min. The tensile strength at which the plastic was peeled off from surface-treated metal sheet was measured, and the obtained value was determined as the adhesive strength. Here, the end of the surface-treated metal sheet as viewed in the longitudinal direction is an end on the side that is not covered with the plastic, and the end of the plastic as viewed in the longitudinal direction is an end on the side to which the surface-treated steel sheet is not bonded.

Example 1

(First Layer)

A hot-dip galvannealed steel sheet having a thickness of 1 mm was prepared. This hot-dip galvannealed steel sheet is a steel sheet in which a plating treatment has been carried out on both surfaces and in which the coating weight is 30 g/m² per one surface. Further, an underlayer treatment was carried out on both surfaces of the hot-dip galvannealed steel sheet by using CTE-213 manufactured by Nihon Parkerizing Co., Ltd. so that the coating weight would be 100 mg/m² per one surface. The first layer forming coating liquid was applied onto one surface of the hot-dip galvannealed steel sheet that had been subjected to the underlayer treatment, by using a bar coater so that the first layer of the surface-treated metal sheet obtained in the end would have a thickness (20 μm) shown in Table 2. As the first layer forming coating liquid, a paint containing an epoxy resin and a blocked isocyanate (the content of the blocked isocyanate relative to the epoxy resin and the blocked isocyanate was 1.5 mass %, CF-701 paint manufactured by BASF Coatings Japan Ltd.) was used. Thereafter, the hot-dip galvannealed steel sheet on which the first layer forming coating liquid had been applied was heated at 220° C. for 2 minutes. By performing this process, the first layer was formed on the hot-dip galvannealed steel sheet.

(Second Layer)

The second layer forming coating liquid was applied onto the first layer of the hot-dip galvannealed steel sheet on which the first layer had been formed, by using a bar coater so that the second layer of the surface-treated metal sheet obtained in the end would have a thickness (5 μm) shown in Table 2. As the second layer forming coating liquid, a coating liquid containing an acid-modified polyolefin (paint-type adhesive suitable for polypropylene, acid-modified polypropylene adhesive "UNISTOLE (registered trademark) R-300" manufactured by Mitsui Chemicals, Inc.) was used. Thereafter, the hot-dip galvannealed steel sheet on which the second layer forming coating liquid had been applied was heated at 220° C. for 2 minutes. By performing this process, the second layer was formed on the first layer, thereby to obtain a surface-treated metal sheet. The obtained surface-treated metal sheet was observed by eye inspection, whereupon generation of inconveniences such as bubbles was not confirmed on the first layer and the second layer.

(Composite Member)

Next, injection molding was carried out using an injection molding machine (PNX60 manufactured by Nissei Plastic Industrial Co., Ltd.). First, the surface-treated metal sheet was cut to a size of 100 mm×25 mm and put into a mold. Thereafter, polypropylene containing 30 mass % of glass fibers (Prime Polypro (registered trademark) E7000 manufactured by Prime Polymer Co., Ltd.) was melted to obtain a composite member provided with a plastic having a size of 100 mm length×25 mm width×3 mm thickness. Here, the plastic was not bonded to the surface-treated metal sheet in such a manner that the surface of the surface-treated metal sheet would be completely covered with the plastic. Instead, the plastic and the surface-treated metal sheet were bonded so as to overlap for 12.5 mm length×25 mm width (so that only a part of the surface of the surface-treated metal sheet would be covered with the plastic), thereby to obtain a composite member. The injection conditions are shown in Table 1.

TABLE 1

| | | |
|---|---|---|
| Molding machine | | PNX 60 injection molding machine manufactured by Nissei Plastic Industrial Co., Ltd. |
| Shape of molded article | | 100 × 25 × 3.0 mm (Insert side: 0.8 mmt) |
| Cylinder temperature (° C.) | Nozzle | 240 |
| | Front part | 250 |
| | Central part | 250 |
| | Rear part | 240 |
| | Rearmost part | 230 |
| Mold temperature (° C.) | | 45~55 |

TABLE 1-continued

| | | |
|---|---|---|
| Injection pressure | Limit pressure (MPa) | 40 |
| | Holding pressure (MPa) | 50 |
| | Filling speed (mm/s) | 10 |
| | Rotational speed of screw (rpm) | 80 |
| | Back pressure (MPa) | 5.0 |
| Settings | Injection holding pressure time (s) | 6.5 |
| | Cooling time (s) | 25.0 |
| | Intermediate time (s) | 0.3 |
| | Metering finishing position (mm) | 30.0 |
| | V-P switching position (mm) | 7.5 |
| Actual measurements | Metering (s) | 7.38 |
| | Packing (s) | 2.47 |
| | 1 cycle(s) | — |

Comparative Example 1

A surface-treated metal sheet was fabricated in the same manner as in Example 1 except that the first layer was not formed. The obtained surface-treated metal sheet was observed by eye inspection, whereupon generation of inconveniences such as bubbles was not confirmed on the second layer.

Examples 2 to 6, Comparative Examples 2, 3, 5

A surface-treated metal sheet was fabricated in the same manner as in Example 1 except that the thickness of the first layer and the thickness of the second layer of the surface-treated metal sheet obtained in the end were changed to the thicknesses shown in Table 2, respectively. The surface-treated metal sheets according to the Examples 2 to 6 and Comparative Examples 2, 3, 5 were observed by eye inspection, whereupon generation of inconveniences such as bubbles was not confirmed on the first layer and the second layer.

Here, in the Example 6, the surface-treated metal sheet was fabricated by laminating a layer corresponding to a thickness of 5 μm for six times in forming the second layer.

Comparative Example 4

A surface-treated metal sheet was fabricated in the same manner as in Example 1 except that, as the first layer forming coating liquid, a paint containing an epoxy resin and not containing a blocked isocyanate (epoxy resin paint NS C682NC manufactured by Nipponpaint Industrial Coatings Co., Ltd.) was used in place of the CF-701 paint. The obtained surface-treated metal sheet was observed by eye inspection, whereupon generation of inconveniences such as bubbles was not confirmed on the first layer and the second layer.

The adhesive strength of each of the obtained composite members was measured by the aforementioned method, and the results are shown in Table 2. Here, when the surface-treated metal sheet according to the Comparative Example 2 was used, the adhesive strength between the plastic and the metal sheet provided in the surface-treated metal sheet was low, and the plastic was peeled off before the measurement of the adhesive strength was carried out, so that the adhesive strength could not be measured. Accordingly, the column of the adhesive strength of the Comparative Example 2 in Table 2 is indicated by "-".

TABLE 2

| | | First layer | | Second layer | | Adhesive strength (MPa) |
|---|---|---|---|---|---|---|
| | | First layer forming coating liquid | Thickness (μm) | Second layer forming coating liquid | Thickness (μm) | |
| Examples | 1 | CF-701 | 20 | R-300 | 5 | 5.8 |
| | 2 | | 15 | | 5 | 5.7 |
| | 3 | | 25 | | 5 | 5.9 |
| | 4 | | 40 | | 5 | 6.2 |
| | 5 | | 20 | | 4 | 5.2 |
| | 6 | | 20 | | 30 | 10.9 |
| Comparative Examples | 1 | — | | R-300 | 5 | 1.0 |
| | 2 | CF-701 | 5 | | 5 | — |
| | 3 | | 10 | | 5 | 1.2 |
| | 4 | NSC682NC | 20 | | 5 | 3.4 |
| | 5 | CF-701 | 20 | | 3 | 4.3 |

As will be understood from Table 2, when a layer containing an acid-modified polyolefin resin is provided as the second layer, and the first layer having a thickness of 15 to 40 μm and containing an epoxy resin and a blocked isocyanate is provided between the second layer and the metal sheet (steel sheet) (Examples 1 to 6), the adhesive strength was higher than in the case in which the first layer was not provided (Comparative Example 1). Also, each of the surface-treated metal sheets according to the Examples 1 to 6 had a higher adhesive strength than in the cases in which, even though the first layer was provided, the thickness thereof was less than 15 μm (Comparative Examples 2 and 3). Also, each of the surface-treated metal sheets according to the Examples 1 to 6 had a higher adhesive strength than in the cases in which, even though the first layer having a thickness of 15 μm or more was provided, the first layer did not contain a blocked isocyanate (Comparative Example 4). Further, each of the surface-treated metal sheets according to the Examples 1 to 6 had a higher adhesive strength than in the case in which, even though the second layer was provided, the thickness thereof was less than 4 μm (Comparative Example 5).

From the above, it will be understood that the adhesive strength to the polyolefin is enhanced by being provided with a layer having a thickness of 4 to 30 μm and containing an acid-modified polyolefin resin as the second layer and being provided with the first layer having a thickness of 15 to 40 μm and containing an epoxy resin and a blocked isocyanate between the second layer and the metal sheet (steel sheet).

This application is based on Japanese Patent Application No. 2017-53104 filed on Mar. 17, 2017, the contents of which are incorporated in the present application.

While the present invention has been fully and appropriately described in the above by way of embodiments in order to express the present invention, it is to be recognized that those skilled in the art can readily change and/or modify the embodiments described above. Therefore, it is to be construed that the changes or modifications made by those skilled in the art are encompassed within the scope of the claims unless those changes or modifications are at a level that departs from the scope of the claims described in the claims section of the present application.

INDUSTRIAL APPLICABILITY

According to the present invention, there is provided a surface-treated metal sheet for polyolefin adhesion, the surface-treated metal sheet being excellent in adhesiveness to a polyolefin. Also, according to the present invention, there is provided a composite member that is excellent in adhesiveness to a polyolefin.

The invention claimed is:

1. A composite member, comprising:
a surface-treated metal sheet suitable for polyolefin adhesion, the surface-treated metal sheet comprising (i) a metal sheet consisting of a hot-dip galvannealed steel sheet, (ii) a first layer, provided on at least one surface of the metal sheet, consisting of an epoxy resin and a blocked isocyanate, and (iii) a second layer, provided on the first layer, comprising an acid-modified polyolefin resin; and
a plastic provided on the second layer in the surface-treated metal sheet,
wherein the blocked isocyanate is obtained from hexamethylene diisocyanate, oligomerized, blocked with 2-butanone oxime, as an oligomerization product,
wherein the second layer (iii) is a layer obtained from an acid-modified polyolefin paint which is maleic anhydride graft polymerized polypropylene with a melting point of 140° ° C., solid content concentration of 18 mass %, and an average particle size of 10 μm,
wherein the first layer (ii) has a thickness in a range of from 15 to 40 μm,
wherein the second layer (iii) has a thickness in a range of from 4 to 30 μm, and
wherein the plastic comprises a polyolefin.

2. The composite member of claim 1, wherein the thickness of the first layer (ii) is in a range of from 18 to 25 μm.

3. The composite member of claim 1, wherein the thickness of the second layer (iii) is in a range of from 5 to 15 μm.

4. The composite member of claim 1, wherein the polyolefin of the plastic comprises polypropylene.

5. The composite member of claim 1, wherein the first layer (ii) directly contacts the surface-treated metal sheet and the second layer (iii).

6. The composite member of claim 1, wherein the second layer (iii) directly contacts the first layer (ii) and the plastic.

7. The composite member of claim 1, wherein the first layer (ii) directly contacts the surface-treated metal sheet and the second layer (iii), and
wherein the second layer (iii) directly contacts the first layer (ii) and the plastic.

8. The composite member of claim 1, wherein the first layer (ii) directly contacts the surface-treated metal sheet and the second layer (iii),
wherein the second layer (iii) directly contacts the first layer (ii) and the plastic, and
wherein the polyolefin of the plastic comprises polypropylene.

9. The composite member of claim 1, wherein the first layer (ii) directly contacts the surface-treated metal sheet and the second layer (iii),
wherein the second layer (iii) directly contacts the first layer (ii) and the plastic, and
wherein the plastic further comprises glass fibers.

10. The composite member of claim 1, wherein an adhesive strength of the plastic to the metal sheet in the surface-treated metal sheet is greater than 5 MPa, the adhesive strength being a tensile strength measured in a method in which a first end of the surface-treated metal sheet as viewed in a longitudinal direction and an end of the plastic as viewed in the longitudinal direction were held with a chuck of a tensile tester in an atmosphere of 25° C. and pulled at a tensile speed of 10 mm/min.

11. The composite member of claim 1, wherein an adhesive strength of the plastic to the metal sheet in the surface-treated metal sheet is in a range of from 5.2 to 10.9 MPa, the adhesive strength being a tensile strength measured in a method in which a first end of the surface-treated metal sheet as viewed in a longitudinal direction and an end of the plastic as viewed in the longitudinal direction were held with a chuck of a tensile tester in an atmosphere of 25° C. and pulled at a tensile speed of 10 mm/min.

* * * * *